UNITED STATES PATENT OFFICE.

JULIUS HERRIET, OF NEW YORK, N. Y., ASSIGNOR TO JOHN GAYLORD WELLS, OF HARTFORD, CONNECTICUT.

IMPROVEMENT IN GUTTA-PERCHA STEREOTYPE COMPOSITION.

Specification forming part of Letters Patent No. 11,831, dated October 24, 1854.

*To all whom it may concern:*

Be it known that I, JULIUS HERRIET, of the city, county, and State of New York, have invented certain improvements in printing plates or types to be used in the art of printing and in the composition of matter for making the same; and I do hereby declare that the following is a full, clear, and exact description thereof.

Many experiments have been made with a view to produce printing-plates of gutta-percha or caoutchouc, but heretofore without success. Printing-plates have been produced by molding gutta-percha, or rather embossing while in a plastic state under heat; and although such plates have been made to represent accurately the characters, yet the substance was not sufficiently hard to give clear and sharp "impressions," as they are termed, and the angles of the letters, characters, or lines gave away before a sufficient number of impressions could be taken to render the use of such plates economical.

I am not aware that before my invention any one has succeeded in producing printing-plates of caoutchouc or its compounds. Vulcanized caoutchouc can be made hard enough, but then it cannot be rendered plastic to admit of remolding after it has been vulcanized; and even the vulcanizing process to which it must be subjected after it has been molded and embossed, and while in the mold, would be attended with serious practical difficulties.

The object to be attained is a material which shall possess the following properties or qualities: first, plasticity when heated, to admit of being molded or embossed by pressure, so as to reproduce accurately the letters or characters with a smooth surface and clear, sharp angles, for without this good impressions cannot be given; secondly, sufficient hardness, when molded or embossed, to resist the repeated pressure applied to make good and clean impressions, for without this such plates cannot be economically substituted for metal stereotypes; and, thirdly, the property of being again rendered plastic by reheating, so that after the required number of impressions have been taken the plate can be remolded or re-embossed by simply subjecting it to heat. This remolding or re-embossing is essential as a matter of economy. None of the substances or compounds known or produced prior to my invention possess all these three qualities or properties, and they are all essential.

My invention consists in producing printing-plates, and molds for producing the same, of a preparation or compound of which gutta-percha or india-rubber constitutes the chief ingredient, which preparation or compound shall be sufficiently plastic, when heated, to admit of molding or embossing by pressure the mold from a form of types (which can then be distributed) and the printing plate or plates from the mold or molds, and when produced and cold shall be sufficiently hard to present sharp lines or angles and resist the required pressures for practical and economical purposes, and when worn out admit of being worked over again by being reheated.

To enable any one skilled in the art most nearly allied to make and use my invention, I will proceed to describe the mode of procedure which I have practiced with success.

I take, by weight, three parts of gutta-percha or three parts of india-rubber or caoutchouc and three parts of finely-pulverized graphite, or soapstone, or plaster-of-paris, or chloride of lime, or peroxide of manganese, or other equivalent, and by grinding or otherwise in a heated state mix them together, as in the manufacture of the usual compounds of gutta-percha or india-rubber. These proportions may be varied, increasing the quantity of gutta-percha or india-rubber if the plates are required to be softer, and vice versa. I then take a mold made of the compound just described, or other suitable substance, having the impressions in reverse of those intended to be produced on the printing-plate, and obtained, if desired, from the usual form of types, and having heated the gutta-percha or india-rubber compound so as to have it in a plastic state, and rubbed or otherwise coated the compound with graphite or the equivalent to prevent adhesion, I introduce the compound, prepared as above described, and force or otherwise press it into the mold to procure an accurate impression, taking care to have the body of the plate of the required and uniform thickness. The plate thus molded is then permitted to cool and acquire the required consistency. When thus produced it will be found to present sufficient hardness or stiffness to give good and sharp impressions and at the same time admit of being bent, if desired, onto the periphery of a cylinder, so as to take the perfect cylindrical form. The angles and lines of the figures or characters will be found as perfect as if molded from molten metal, and in all respects will be found suitable to the purpose.

Plates thus produced, it will be obvious, can be employed on flat beds of platen-presses in the manner of ordinary stereotype-plates, or in any other manner of giving good impressions. After such plates have been completely worn out or otherwise put out of use the substance can be softened again by heat, so as to be remolded.

I do not wish to limit myself to the use of either of the substances enumerated as being combined with the gutta-percha or india-rubber, as many other substances may be employed, the object of such substance or substances being simply to give the required consistency and hardness to the compound, while at the same time it will not prevent it from becoming sufficiently soft and pliable under the influence of heat to admit of being molded.

What I claim as my invention, and desire to secure by Letters Patent, is—

Making molds and plates, for printing characters or figures, of gutta-percha or india-rubber compounded with some other substance or substances, substantially such as described, which shall give to the compound the required hardness and stiffness and not destroy its plasticity when in a heated state, substantially as described.

JULIUS HERRIET.

Witnesses:
CAUSTEN BROWNE,
HENRY BYRON.